United States Patent
Tada et al.

(10) Patent No.: US 12,467,054 B2
(45) Date of Patent: Nov. 11, 2025

(54) TRANSLATION ENHANCER, TEMPLATE NUCLEIC ACID, PRODUCTION METHOD OF TRANSLATION TEMPLATE, AND PRODUCTION METHOD OF PROTEIN

(71) Applicant: NUProtein Co., Ltd., Tokushima (JP)

(72) Inventors: Hiroaki Tada, Tokushima (JP); Masataka Minami, Hyogo (JP)

(73) Assignee: NUProtein Co., Ltd., Tokushima (JP)

( * ) Notice: Subject to any disclaimer, the term of this patent is extended or adjusted under 35 U.S.C. 154(b) by 968 days.

(21) Appl. No.: 17/269,186

(22) PCT Filed: Sep. 24, 2020

(86) PCT No.: PCT/JP2020/035949
§ 371 (c)(1),
(2) Date: Feb. 17, 2021

(87) PCT Pub. No.: WO2021/070616
PCT Pub. Date: Apr. 15, 2021

(65) Prior Publication Data
US 2022/0333121 A1 Oct. 20, 2022

(30) Foreign Application Priority Data
Oct. 10, 2019 (JP) .................. 2019-187039

(51) Int. Cl.
C12N 15/67 (2006.01)
C12P 21/02 (2006.01)
(52) U.S. Cl.
CPC .............. *C12N 15/67* (2013.01); *C12P 21/02* (2013.01)
(58) Field of Classification Search
CPC ........ C12N 15/67; C12N 15/63; C12N 15/11; C12P 21/02
See application file for complete search history.

(56) References Cited

U.S. PATENT DOCUMENTS

| | | | | |
|---|---|---|---|---|
| 10,010,592 | B2 * | 7/2018 | Thess ............ | A61K 39/001132 |
| 2018/0119154 | A1 | 5/2018 | Tada et al. | |
| 2018/0327829 | A1 | 11/2018 | Mir | |

FOREIGN PATENT DOCUMENTS

| EP | 1221481 A1 | 7/2002 |
|---|---|---|
| EP | 3178488 A1 | 6/2017 |
| JP | 2005247857 A | 9/2005 |
| JP | 2007097438 A | 4/2007 |
| JP | 2008035701 A | 2/2008 |
| JP | 2009072207 A | 4/2009 |
| JP | 2013158342 A | 8/2013 |
| WO | 2016143799 A1 | 9/2016 |

OTHER PUBLICATIONS

Erik D. Carlson, Rui Gan, C. Eric Hodgman, Michael C. Jewett, Cell-free protein synthesis: Applications come of age, Biotechnology Advances, vol. 30, Issue 5, (Year: 2012).*
Jesusa L. Rosales, Ki-Young Lee, Purification of Dual-Tagged Intact Recombinant Proteins, Biochemical and Biophysical Research Communications, vol. 273, Issue 3, 2000, pp. 1058-1062, ISSN 0006-291X, https://doi.org/10.1006/bbrc.2000.3063. (Year: 2000).*
Terpe, K. "Overview of tag protein fusions: from molecular and biochemical fundamentals to commercial systems." Applied microbiology and biotechnology 60 (2003): 523-533 (Year: 2003).*
Hirao I, Nishimura Y, Tagawa Y, Watanabe K, Miura K. Extraordinarily stable mini-hairpins: electrophoretical and thermal properties of the various sequence variants of d(GCGAAAGC) and their effect on DNA sequencing. Nucleic Acids Res. Aug. 11, 1992;20(15): 3891-6. doi: 10.1093/nar/20.15.3891. (Year: 1992).*
Beverly et al. Poly A tail length analysis of in vitro transcribed mRNA by LC-MS. Analytical and Bioanalytical Chemistry (2018) 410: 1667-1677. (Year: 2018).*
First Examination Report issued in the corresponding Australian Patent Application No. 2020361848 dated Feb. 14, 2023 (3 pages).
Examiner's Report issued in the corresponding Canadian Patent Application No. 3, 150,754 dated Feb. 21, 2023 (3 pages).
Rui Gan et al., A combined cell-free transcription-translation system from *Saccharomyces cerevisiae* for rapid and robust protein synthesis, Biotechnology Journal, 9, 641-651, 2014.
Written Opinion of the International Searching Authority issued Nov. 24, 2020.
Notice of Reasons for Refusal issued Jun. 15, 2020 in Chinese Application No. 2019-187039.
The Extended European Search Report issued in corresponding EP Application No. 20848948.4, dated Nov. 12, 2021.

(Continued)

*Primary Examiner* — Brian Whiteman
*Assistant Examiner* — Amanda M Zahorik
(74) *Attorney, Agent, or Firm* — Rimon P.C.

(57) ABSTRACT

The object is to provide a translation enhancer that improves synthesis efficiency of a target protein. The object is achieved by a translation enhancer in a cell-free protein synthesis system, and the translation enhancer consists of a nucleic acid as a 3' untranslated region linked adjacent to a 3' terminal of a code region that encodes an amino acid sequence of a target protein, the 3' untranslated region comprises a first region consisting of a sequence of 10 to 40 nucleic acids adjacent to the 3' terminal of the code region and a second region consisting of a poly-A sequence having continuous 2 to 40 "A"s linked to the first region, and the first region has a hairpin structure.

18 Claims, 9 Drawing Sheets

Specification includes a Sequence Listing.

(56) References Cited

OTHER PUBLICATIONS

Office Action issued in the corresponding Singapore Patent Application No. 11202201198U dated May 26, 2023 (5 pages).
Chinese Office Action dated Jun. 27, 2024 issued in the corresponding Chinese Patent Application No. 202080004414.5, with English machine translation.
European Office Action dated Sep. 5, 2024 issued in the corresponding European Patent Application No. 20848948.4.

* cited by examiner

< Example 1 >

< Example 2 >

< Comparative example 1 >

< Comparative example 2 >

< Comparative example 3 >

< Example 3 >

< Example 4 >

< Example 5 >

```
SEQUENCE LISTING

<160> NUMBER OF SEQ ID NOS: 42

<210> SEQ ID NO 1
<211> LENGTH: 27
<212> TYPE: DNA
<213> ORGANISM: Artificial Sequence
<220> FEATURE:
<223> OTHER INFORMATION: T7 promoter

<400> SEQUENCE: 1
cccgcgaaat taatacgact cactata                                    27

<210> SEQ ID NO 2
<211> LENGTH: 59
<212> TYPE: DNA
<213> ORGANISM: Artificial Sequence
<220> FEATURE:
<223> OTHER INFORMATION: Enhancer

<400> SEQUENCE: 2
gggctcacct atctctctac acaaaacatt tccctacata caactttcaa cttcctatt   59

<210> SEQ ID NO 3
<211> LENGTH: 621
<212> TYPE: DNA
<213> ORGANISM: Artificial Sequence
<220> FEATURE:
<223> OTHER INFORMATION: CSF3

<400> SEQUENCE: 3
atggctggac ctgccaccca gagccccatg aagctgatgg ccctgcagct gctgctgtgg    60
cacagtgcac tctggacagt gcaggaagcc acccccctgg gccctgccag ctccctgccc   120
cagagcttcc tgctcaagtg cttagagcaa gtgaggaaga tccagggcga tggcgcagcg   180
ctccaggaga agctggtgag tgagtgtgcc acctacaagc tgtgccaccc cgaggagctg   240
gtgctgctcg gacactctct gggcatcccc tgggctcccc tgagcagctg ccccagccag   300
gccctgcagc tggcaggctg cttgagccaa ctccatagcg gccttttcct ctaccagggg   360
ctcctgcagg ccctggaagg gatctccccc gagttgggtc ccaccttgga cacactgcag   420
ctggacgtcg ccgactttgc caccaccatc tggcagcaga tggaagaact gggaatggcc   480
cctgccctgc agcccaccca gggtgccatg ccggccttcg cctctgcttt ccagcgccgg   540
gcaggagggg tcctggttgc ctcccatctg cagagcttcc tggaggtgtc gtaccgcgtt   600
```

```
ctacgccacc ttgcccagcc c                                         621

<210> SEQ ID NO 4
<211> LENGTH: 21
<212> TYPE: DNA
<213> ORGANISM: Artificial Sequence
<220> FEATURE:
<223> OTHER INFORMATION: Linker_C

<400> SEQUENCE: 4
ggactccagc agggaggtac t                                          21

<210> SEQ ID NO 5
<211> LENGTH: 24
<212> TYPE: DNA
<213> ORGANISM: Artificial Sequence
<220> FEATURE:
<223> OTHER INFORMATION: FLAG tag

<400> SEQUENCE: 5
gactacaagg atgacgatga caag                                       24

<210> SEQ ID NO 6
<211> LENGTH: 60
<212> TYPE: DNA
<213> ORGANISM: Artificial Sequence
<220> FEATURE:
<223> OTHER INFORMATION: Artificial 3'UTR

<400> SEQUENCE: 6
taaaaaaaaa aaagagctct tggatccggc cataagggcc tgatccttcg agggggggcc     60

<210> SEQ ID NO 7
<211> LENGTH: 33
<212> TYPE: DNA
<213> ORGANISM: Artificial Sequence
<220> FEATURE:
<223> OTHER INFORMATION: Artificial 3'UTR

<400> SEQUENCE: 7
tagaataagg ccatttttac cggaaaaaaa aaa                              33

<210> SEQ ID NO 8
<211> LENGTH: 33
<212> TYPE: DNA
<213> ORGANISM: Artificial Sequence
<220> FEATURE:
<223> OTHER INFORMATION: Artificial 3'UTR

<400> SEQUENCE: 8
tagaataagg cccttttttcc cggaaaaaaa aaa                             33

<210> SEQ ID NO 9
<211> LENGTH: 33
<212> TYPE: DNA
<213> ORGANISM: Artificial Sequence
<220> FEATURE:
<223> OTHER INFORMATION: Artificial 3'UTR

<400> SEQUENCE: 9
tagaataagt gctcgggctg gccaaaaaaa aaa                              33

<210> SEQ ID NO 10
<211> LENGTH: 33
<212> TYPE: DNA
<213> ORGANISM: Artificial Sequence
```

<220> FEATURE:
<223> OTHER INFORMATION: Artificial 3'UTR

<400> SEQUENCE: 10
tagaataagt gctcgggctg gtcaaaaaaa aaa					33

<210> SEQ ID NO 11
<211> LENGTH: 58
<212> TYPE: DNA
<213> ORGANISM: Artificial Sequence
<220> FEATURE:
<223> OTHER INFORMATION: Primer

<400> SEQUENCE: 11
cacaaaacat ttccctacat acaactttca acttcctatt atggctggac ctgccacc					58

<210> SEQ ID NO 12
<211> LENGTH: 39
<212> TYPE: DNA
<213> ORGANISM: Artificial Sequence
<220> FEATURE:
<223> OTHER INFORMATION: Primer

<400> SEQUENCE: 12
agtacctccc tgctggagac cgggctgggc aaggtggcg					39

<210> SEQ ID NO 13
<211> LENGTH: 94
<212> TYPE: DNA
<213> ORGANISM: Artificial Sequence
<220> FEATURE:
<223> OTHER INFORMATION: Primer

<400> SEQUENCE: 13
ccctcgaagg atcaggccct tatggccgga tccaagagct cttttttttt tttacttgtc					60 atcgtcatcc ttgtagtcag tacctccctg ctgg					94

<210> SEQ ID NO 14
<211> LENGTH: 63
<212> TYPE: DNA
<213> ORGANISM: Artificial Sequence
<220> FEATURE:
<223> OTHER INFORMATION: Primer

<400> SEQUENCE: 14
ggccctcccg agcacttatt ctacttgtca tcgtcatcct tgtagtcagt acctccctgc					60 tgg					63

<210> SEQ ID NO 15
<211> LENGTH: 16
<212> TYPE: DNA
<213> ORGANISM: Artificial Sequence
<220> FEATURE:
<223> OTHER INFORMATION: Primer

<400> SEQUENCE: 15 ggcccccccct cgaagg					16

<210> SEQ ID NO 16
<211> LENGTH: 43
<212> TYPE: DNA
<213> ORGANISM: Artificial Sequence
<220> FEATURE:
<223> OTHER INFORMATION: Primer

<400> SEQUENCE: 16
tttttttttt ccggtaaaaa tggccttatt ctacttgtca tcg                43

<210> SEQ ID NO 17
<211> LENGTH: 43
<212> TYPE: DNA
<213> ORGANISM: Artificial Sequence
<220> FEATURE:
<223> OTHER INFORMATION: Prime

<400> SEQUENCE: 17
tttttttttt ccgggaaaaa gggccttatt ctacttgtca tcg                43

<210> SEQ ID NO 18
<211> LENGTH: 43
<212> TYPE: DNA
<213> ORGANISM: Artificial Sequence
<220> FEATURE:
<223> OTHER INFORMATION: Primer

<400> SEQUENCE: 18
tttttttttt ggccagcccg agcacttatt ctacttgtca tcg                43

<210> SEQ ID NO 19
<211> LENGTH: 43
<212> TYPE: DNA
<213> ORGANISM: Artificial Sequence
<220> FEATURE:
<223> OTHER INFORMATION: Primer

<400> SEQUENCE: 19
tttttttttt gaccagcccg agcacttatt ctacttgtca tcg                43

<210> SEQ ID NO 20
<211> LENGTH: 60
<212> TYPE: DNA
<213> ORGANISM: Artificial Sequence
<220> FEATURE:
<223> OTHER INFORMATION: Primer

<400> SEQUENCE: 20
cccgcgaaat taatacgact cactataggg ctcacctatc tctctacaca aaacatttcc    60

<210> SEQ ID NO 21
<211> LENGTH: 13
<212> TYPE: DNA
<213> ORGANISM: Artificial Sequence
<220> FEATURE:
<223> OTHER INFORMATION: Artificial 3'UTR

<400> SEQUENCE: 21
tagaaaaaaa aaa                                                 13

<210> SEQ ID NO 22
<211> LENGTH: 23
<212> TYPE: DNA
<213> ORGANISM: Artificial Sequence
<220> FEATURE:
<223> OTHER INFORMATION: Artificial 3'UTR

<400> SEQUENCE: 22
tagaataagt gctaaaaaaa aaa                                      23

<210> SEQ ID NO 23
<211> LENGTH: 43

<212> TYPE: DNA
<213> ORGANISM: Artificial Sequence
<220> FEATURE:
<223> OTHER INFORMATION: Artificial 3'UTR

<400> SEQUENCE: 23
tagaataaag taaatatagt gctcgggcgg gccaaaaaaa aaa           43

<210> SEQ ID NO 24
<211> LENGTH: 53
<212> TYPE: DNA
<213> ORGANISM: Artificial Sequence
<220> FEATURE:
<223> OTHER INFORMATION: Artificial 3'UTR

<400> SEQUENCE: 24
tagaataaag taaatataca cgagcccggt gctcgggcgg gccaaaaaaa aaa           53

<210> SEQ ID NO 25
<211> LENGTH: 53
<212> TYPE: DNA
<213> ORGANISM: Artificial Sequence
<220> FEATURE:
<223> OTHER INFORMATION: Primer

<400> SEQUENCE: 25
tcatccttgt agtcagtacc tccctgctgg agaccgggct gggcaaggtg gcg           53

<210> SEQ ID NO 26
<211> LENGTH: 43
<212> TYPE: DNA
<213> ORGANISM: Artificial Sequence
<220> FEATURE:
<223> OTHER INFORMATION: Primer

<400> SEQUENCE: 26
ctacttgtca tcgtcatcct tgtagtcagt acctccctgc tgg           43

<210> SEQ ID NO 27
<211> LENGTH: 53
<212> TYPE: DNA
<213> ORGANISM: Artificial Sequence
<220> FEATURE:
<223> OTHER INFORMATION: Primer

<400> SEQUENCE: 27
agcacttatt ctacttgtca tcgtcatcct tgtagtcagt acctccctgc tgg           53

<210> SEQ ID NO 28
<211> LENGTH: 57
<212> TYPE: DNA
<213> ORGANISM: Artificial Sequence
<220> FEATURE:
<223> OTHER INFORMATION: Primer

<400> SEQUENCE: 28
ggccctcccg agcactatat ttactttatt ctacttgtca tcgtcatcct tgtagtc           57

<210> SEQ ID NO 29
<211> LENGTH: 67
<212> TYPE: DNA
<213> ORGANISM: Artificial Sequence
<220> FEATURE:
<223> OTHER INFORMATION: Primer

<400> SEQUENCE: 29

```
ggccctcccg agcaccgggc tcgtgtatat ttactttatt ctacttgtca tcgtcatcct    60
tgtagtc                                                              67
```

<210> SEQ ID NO 30
<211> LENGTH: 25
<212> TYPE: DNA
<213> ORGANISM: Artificial Sequence
<220> FEATURE:
<223> OTHER INFORMATION: Primer

<400> SEQUENCE: 30

```
ttttttttttt ctacttgtca tcgtc                                         25
```

<210> SEQ ID NO 31
<211> LENGTH: 23
<212> TYPE: DNA
<213> ORGANISM: Artificial Sequence
<220> FEATURE:
<223> OTHER INFORMATION: Primer

<400> SEQUENCE: 31

```
ttttttttttt agcacttatt cta                                           23
```

<210> SEQ ID NO 32
<211> LENGTH: 25
<212> TYPE: DNA
<213> ORGANISM: Artificial Sequence
<220> FEATURE:
<223> OTHER INFORMATION: Primer

<400> SEQUENCE: 32

```
ttttttttttt ggcccgcccg agcac                                         25
```

<210> SEQ ID NO 33
<211> LENGTH: 23
<212> TYPE: DNA
<213> ORGANISM: Artificial Sequence
<220> FEATURE:
<223> OTHER INFORMATION: Artificial 3'UTR

<400> SEQUENCE: 33

```
tagaataagt gctcgggcgg gcc                                            23
```

<210> SEQ ID NO 34
<211> LENGTH: 33
<212> TYPE: DNA
<213> ORGANISM: Artificial Sequence
<220> FEATURE:
<223> OTHER INFORMATION: Artificial 3'UTR

<400> SEQUENCE: 34

```
tagaataagt gctcgggcgg gccaaaaaaa aaa                                 33
```

<210> SEQ ID NO 35
<211> LENGTH: 43
<212> TYPE: DNA
<213> ORGANISM: Artificial Sequence
<220> FEATURE:
<223> OTHER INFORMATION: Artificial 3'UTR

<400> SEQUENCE: 35

```
tagaataagt gctcgggcgg gccaaaaaaa aaaaaaaaaa aaa                      43
```

<210> SEQ ID NO 36
<211> LENGTH: 63

```
<212> TYPE: DNA
<213> ORGANISM: Artificial Sequence
<220> FEATURE:
<223> OTHER INFORMATION: Artificial Sequence

<400> SEQUENCE: 36
tagaataagt gctcgggcgg gccaaaaaaa aaaaaaaaaa aaaaaaaaaa aaaaaaaaaa    60
aaa                                                                 63

<210> SEQ ID NO 37
<211> LENGTH: 25
<212> TYPE: DNA
<213> ORGANISM: Artificial Sequence
<220> FEATURE:
<223> OTHER INFORMATION: Artificial 3'UTR

<400> SEQUENCE: 37
tagaataagt gctcgggcgg gccaa                                         25

<210> SEQ ID NO 38
<211> LENGTH: 15
<212> TYPE: DNA
<213> ORGANISM: Artificial Sequence
<220> FEATURE:
<223> OTHER INFORMATION: Primer

<400> SEQUENCE: 38
ggcccgcccg agcac                                                    15

<210> SEQ ID NO 39
<211> LENGTH: 25
<212> TYPE: DNA
<213> ORGANISM: Artificial Sequence
<220> FEATURE:
<223> OTHER INFORMATION: Primer

<400> SEQUENCE: 39
tttttttttt ggcccgcccg agcac                                         25

<210> SEQ ID NO 40
<211> LENGTH: 35
<212> TYPE: DNA
<213> ORGANISM: Artificial Sequence
<220> FEATURE:
<223> OTHER INFORMATION: Primer

<400> SEQUENCE: 40
tttttttttt tttttttttt ggcccgcccg agcac                              35

<210> SEQ ID NO 41
<211> LENGTH: 55
<212> TYPE: DNA
<213> ORGANISM: Artificial Sequence
<220> FEATURE:
<223> OTHER INFORMATION: Primer

<400> SEQUENCE: 41
tttttttttt tttttttttt tttttttttt tttttttttt ggcccgcccg agcac        55
```

```
<210> SEQ ID NO 42
<211> LENGTH: 17
<212> TYPE: DNA
<213> ORGANISM: Artificial Sequence
<220> FEATURE:
<223> OTHER INFORMATION: Primer

<400> SEQUENCE: 42 ttgcccgcc cgagcac                                                    17
```

TRANSLATION ENHANCER, TEMPLATE NUCLEIC ACID, PRODUCTION METHOD OF TRANSLATION TEMPLATE, AND PRODUCTION METHOD OF PROTEIN

CROSS REFERENCE TO RELATED APPLICATIONS

This application is the U.S. National Phase under 35 U.S.C. § 371 of International Application No. PCT/JP2020/035949, filed on Sep. 24, 2020, which in turn claims the benefit of Japanese Application No. 2019-187039, filed on Oct. 10, 2019, the entire contents of each are hereby incorporated by reference.

TECHNICAL FIELD

The disclosure of the present application relates to a translation enhancer, a template nucleic acid, a production method of a translation template, and a production method of a protein.

BACKGROUND ART

A synthesis system to synthesize a protein in a cell-free manner is a protein synthesis system to prepare a medium containing intercellular elements related to protein synthesis and perform the process from transcription to translation of template DNA in a cell-free manner. Various such cell-free protein synthesis systems are known. As such synthesis systems, there are a system to apply template DNA, which is a transcription template, to a medium to synthesize a final product protein and a system to apply mRNA, which is a translation template, to a medium to synthesize the protein.

In both the systems, it is required to synthesize transcription template DNA as an initial raw material. In synthesis of transcription template DNA, typically, cDNA that encodes a protein to be synthesized is first cloned, the cloned cDNA is incorporated in a plasmid, and a DNA region used for expression including a promoter, a code region, a terminator, and the like is constructed. Then, such a DNA region is cut out from the plasmid or a PCR is directly performed on the plasmid to obtain template DNA.

It is considered that the structure of template DNA affects the expression efficiency in a cell-free protein synthesis system, and various attempts have been made for a vector constructing an expression cassette. For example, it is reported that a particular translational promoting sequence is introduced in a 5' untranslated region (5'UTR) (Patent Literatures 1 and 2). Further, it is disclosed that an elongated 3' untranslated region (3'UTR) increases the life of mRNA, which is a translation template, and improves the translation efficiency (Patent Literature 3). It is also reported that the 3'UTR of mRNA preferably has 1000 or more bases (Patent Literatures 4 and 5).

Further, use of 3'UTR is mentioned for a cell-free protein synthesis system using a yeast extract (Non-Patent Literature 1).

On the other hand, it is known that transcription template DNA can be acquired by a nucleic acid amplification reaction with the 3'UTR having 200 or less bases, and mRNA and a protein can be efficiently acquired by applying such transcription template DNA to a cell-free protein synthesis system (see Patent Literature 6).

CITATION LIST

Patent Literature

Patent Literature 1: Japanese Patent Application Publication No. 2009-72207
Patent Literature 2: Japanese Patent Application Publication No. 2013-158342
Patent Literature 3: Japanese Patent Application Publication No. 2007-97438
Patent Literature 4: Japanese Patent Application Publication No. 2008-35701
Patent Literature 5: Japanese Patent Application Publication No. 2005-247857
Patent Literature 6: International Publication No. WO2016/143799

Non-Patent Literature

Non-Patent Literature 1: Biotechonology Journal, 2014, 9, 641-651

SUMMARY OF INVENTION

Technical Problem

In a cell-free protein synthesis system, it is required to synthesize mRNA, which is a translation template, from template DNA. Thus, in terms of mRNA synthesis efficiency, the 3'UTR that is not related to synthesis of a target protein is preferably shorter. However, a higher synthesis efficiency for the target protein is preferable.

The disclosure of the present application has been made in order to solve the problem of the prior art described above, and according to a thorough study, it has been newly found that, (1) as a nucleic acid of a 3' untranslated region linked adjacently to a 3' terminal of a code region that encodes the amino acid sequence of a target protein, (2) a first region consisting of a sequence of 10 to 40 nucleic acids adjacent to the 3' terminal of the code region and a second region consisting of a poly-A sequence having continuous 2 to 40 "A"s linked to the first region are included, (3) the first region has a hairpin structure, and thereby (4) synthesis efficiency of the target protein is improved even with a relatively shorter 3' untranslated region.

That is, the object of the disclosure of the present application is to provide a translation enhancer, a template nucleic acid, a production method of a translation template, and a production method of a protein that improve synthesis efficiency of the target protein even with a relatively shorter 3' untranslated region.

Solution to Problem

The disclosure of the present application relates to a translation enhancer, a template nucleic acid, a production method of a translation template, and a production method of a protein as illustrated below.

(1) A translation enhancer in a cell-free protein synthesis system, the translation enhancer consisting of a nucleic acid as a 3' untranslated region linked adjacent to a 3' terminal of a code region that encodes an amino acid sequence of a target protein,
wherein the 3' untranslated region comprises
a first region consisting of a sequence of 10 to 40 nucleic acids adjacent to the 3' terminal of the code region, and a second region consisting of a poly-A sequence having continuous 2 to 40 "A"s linked to the first region, and wherein the first region has a hairpin structure.

(2) A template nucleic acid used in a cell-free protein synthesis system, the template nucleic acid comprising:
a promoter region;
a code region that encodes an amino acid sequence of a target protein linked so as to be operable by the promoter region; and
a 3' untranslated region of the code region, wherein the 3' untranslated region consists of the translation enhancer according to (1) above.

(3) The template nucleic acid according to (2) above, wherein the code region is a region that encodes a fusion protein containing a protein tag at the C-terminal of any protein as the target protein.

(4) The template nucleic acid according to (2) above, wherein the code region is a region that encodes a fusion protein containing a protein tag at the N-terminal of any protein as the target protein.

(5) The template nucleic acid according to (3) above, wherein the code region is a region that encodes a fusion protein containing a protein tag at the N-terminal of any protein as the target protein.

(6) The template nucleic acid according to any one of (2) to (5) above, wherein the template nucleic acid is a transcription template DNA.

(7) The template nucleic acid according to any one of (2) to (5) above, wherein the template nucleic acid is a translation template mRNA.

(8) A production method of a translation template for a cell-free protein synthesis system, the production method comprising a step of synthesizing translation template mRNA by using the template nucleic acid according to any one of (2) to (6) above in the absence of a cell and in the presence of an element used for transcribing a transcription template DNA onto mRNA.

(9) A production method of a protein, the production method comprising a step of synthesizing a protein by using the template nucleic acid according to (7) above in the absence of a cell and in the presence of an element used for translating translation template mRNA into a protein.

DESCRIPTION OF EMBODIMENTS

A translation enhancer, a template nucleic acid, a production method of a translation template, and a production method of a protein disclosed in the present application will be described below in detail. Note that the following description is provided for easier understanding, and the scope of technical features disclosed in the present application is not limited to the following description. It goes without saying that, other than the following illustrations, appropriate changes can be made within the scope not impairing the purpose disclosed in the present application.

(Translation enhancer)

Figure 1:
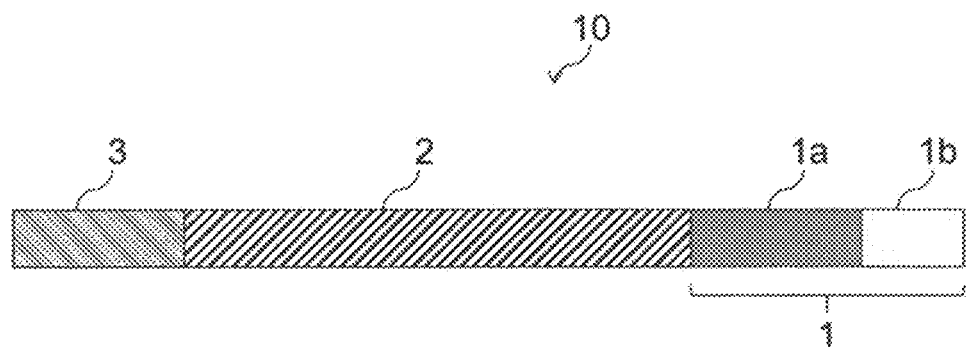
FIG. 1 is a schematic diagram illustrating an overview of a translation enhancer and a template nucleic acid.

Embodiments of a translation enhancer will be described with reference to FIG. 1. FIG. 1 is a schematic diagram illustrating an overview of a translation enhancer. A translation enhancer 1 is linked adjacently to the 3' terminal of a code region 2 that encodes the amino acid sequence of a target protein in a template nucleic acid used in a cell-free protein synthesis system. Further, the translation enhancer 1 is made of a nucleic acid as the 3' untranslated region that is not synthesized as a protein. The translation enhancer 1 according to the embodiment is formed of a first region 1*a* adjacent to the 3' terminal of the code region 2 and a second region 1*b* linked to the first region 1*a*.

The first region 1*a* has a hairpin structure. Note that, in the present specification, "hairpin structure" means a stable loop structure formed paired with another nucleic acid in the nucleic acid forming the first region 1*a*. The nucleic acid sequence is not particularly limited as long as the first region 1*a* is a sequence that can form the hairpin structure. Further, the length of nucleic acids (the number of nucleic acids) forming the first region 1*a* may be, for example, 10 or greater, 13 or greater, 15 or greater, or 20 or greater, because an excessively short nucleic acid sequence makes it difficult to form the hairpin structure or causes a stop codon to be included in or close to the hairpin structure. On the other hand, the upper limit is not particularly limited as long as protein synthesis can be made. In general, however, a template nucleic acid DNA including the promoter 3, the code region 2, and the 3' untranslated region 1 is acquired by a nucleic acid amplification reaction such as a PCR. Thus, a shorter template nucleic acid DNA is preferable in terms of primer design or in terms of cost. Therefore, in terms of efficiency, the length of nucleic acids forming the first region 1*a* may be 50 or less, 45 or less, 40 or less, or 30 or less. Note that the number of "loop structures" formed in the first region 1*a* may be one or two or greater.

The second region 1*b* is formed of a poly-A sequence having continuous "A"s (adenines). The length of "A"s (the number of nucleic acids) can be, for example, 2 or greater, 3 or greater, 4 or greater, 5 or greater, 6 or greater, 7 or greater, 8 or greater, 9 or greater, 10 or greater, 11 or greater, 12 or greater, 13 or greater, 14 or greater, or 15 or greater, because an excessively small length does not improve the protein synthesis efficiency. On the other hand, while the upper limit is not particularly limited as long as cell-free protein synthesis can be made in the same manner as for the first region 1a, the length (the number) of "A"s (adenines) forming the second region 1b can be 50 or less, 45 or less, 40 or less, 35 or less, or 30 or less in terms of primer design or in terms of cost.

With the use of the translation enhancer according to the embodiment, the protein synthesis efficiency is improved by arranging the first region 1a and the second region 1b in series to the 3' terminal of the code region 2, as illustrated in Examples and Comparative examples described later, though the mechanism of improvement of target protein synthesis efficiency is unknown.

When applied to transcription template DNA, the translation enhancer is provided as a DNA double-strand at the 3' terminal side of this DNA. Further, when applied to a translation template mRNA, the translation enhancer is provided as a single-strand RNA at the 3' terminal side of this mRNA.

(Template Nucleic Acid)

An embodiment of a template nucleic acid will be described with reference to FIG. 1. FIG. 1 is a schematic diagram illustrating an overview of a template nucleic acid. A template nucleic acid 10 includes the promoter region 3, the code region 2 that encodes the amino acid sequence of a target protein, and the translation enhancer 1. The translation enhancer 1 has already been described, and the promoter region 3 and the code region 2 will be described below.

The promoter region 3 is not particularly limited for the sequence as long as it functions as a transcription start portion when a gene is transcribed, and a promoter sequence known in this technical field may be employed. The sequence forming the promoter region 3 may be the known T7 promoter sequence, the known SP6 promoter sequence, the known T3 promoter sequence, or the like, which are examples and not limitation.

The code region 2 is not particularly limited as long as it is a nucleic acid sequence that encodes the amino acid of a target protein and is linked so as to be operable by the promoter region 3.

Note that, although the code region 2 is linked directly to the tail of the promoter region 3 in the example illustrated in FIG. 1, a sequence that encodes a protein tag (C-terminal protein tag) added to the target protein synthesized by the code region 2 may be linked on the promoter region 3 side of the code region 2. With inclusion of a protein tag sequence, the target protein can be synthesized as a tagged fusion protein. Similarly, a sequence that encodes a protein tag (N-terminal protein tag) added to the target protein synthesized by the code region 2 may be linked on the translation enhancer 1 side of the code region 2. One of the C-terminal protein tag sequence and the N-terminal protein tag sequence may be linked, or both thereof may be linked.

The C-terminal protein tag and the N-terminal protein tag may be, for example, a His tag, a GST tag, an MBP tag, a myc tag, a FLAG tag, or a BCCP tag. Further, visibly detectable tag may be, for example, Green Fluorescent Protein (GFP), Blue Fluorescent Protein (BFP), Cyan Fluorescent Protein (CFP), Red Fluorescent Protein (RFP), Yellow Fluorescent Protein (YFP), Enhanced Green Fluorescent Protein (EGFP), Enhanced Cyan Fluorescent Protein (ECFP), Enhanced Red Fluorescent Protein (ERFP), Enhanced Yellow Fluorescent Protein (EYFP), TetraMethyl-Rhodamine (TMR), luciferase, or the like. Note that the C-terminal protein tags and the N-terminal protein tags described above are mere examples, and other protein tags may be employed.

Note that the C-terminal protein tag sequence and the N-terminal protein tag sequence may be linked directly to or linked via a suitable linker sequence to the N-terminal and/or C-terminal of any protein sequence.

The template nucleic acid is one of the elements used in a cell-free protein synthesis system described later. The template nucleic acid is transcription template DNA or may be translation template mRNA. Further, the transcription template DNA may be cyclic DNA such as a plasmid or linear DNA synthesized by a PCR or the like. When the template nucleic acid is in a form of DNA double-strand that may be used in a cell-free protein synthesis system and when the sense strand has a poly-A sequence as a translation enhancer, the anti-sense strand will have a poly-T sequence in association with the anti-sense strand. Further, when the transcription template DNA or the translation template mRNA has a translation enhancer, the translation enhancer is provided on the 3' terminal side thereof.

Although a template nucleic acid can be acquired by a known chemical or genetic engineering method, it is preferable to use a nucleic acid amplification reaction such as a PCR to acquire a gene or cDNA as a template, as described later. Further, the translation template mRNA can be acquired by a known synthesis method for translation template mRNA applied to a two-step method or the like.

(Production Method of Transcription Template DNA)

The production method of transcription template DNA used for a cell-free protein synthesis system may include a step of synthesizing transcription template DNA by performing a nucleic acid amplification reaction on DNA including a code region of a target protein. The transcription template DNA can be obtained by a nucleic acid amplification reaction of a PCR for DNA including the code region that encodes the amino acid sequence of a target protein by using a suitably designed primer set, for example.

Further, the transcription template DNA can also be obtained by using a vector. A template nucleic acid can be acquired by inserting, in a vector, DNA including at least a code region that encodes the amino acid sequence of a protein. The vector created in such a way can be directly used as transcription template DNA, or a DNA fragment corresponding to the transcription template DNA may be cut out from the vector for use.

For example, the transcription template DNA may be applied to a cell-free protein synthesis system as a PCR reaction solution (that is, without purification of the transcription template DNA) or may be applied to a cell-free protein synthesis system with purification or the like as appropriate.

(Production Method of Translation Template mRNA)

The production method of a translation template used for a cell protein synthesis system can have a step of synthesizing translation template mRNA by using transcription template DNA in the absence of a cell and in the presence of an element used for transcribing a transcription template DNA onto mRNA. More specifically, a translation template mRNA can be obtained by incubating a transcription template DNA derived from a PCR reaction solution or a vector including the transcription template DNA with RNA polymerase adapted to a promoter region provided to the transcription template DNA and substrates used for RNA synthesis (four types of ribonucleoside triphosphates) or the like, for example, at around 20 degrees Celsius to 60 degrees Celsius, preferably, around 30 degrees Celsius to 42 degrees Celsius for a suitable period of time under a composition containing a component required for a transcription reaction. Note that the above example illustrates a procedure for synthesizing translation template mRNA from transcription template DNA. Alternatively, mRNA may be directly synthesized by nucleic acid synthesis for certain lengths of mRNA.

The production method of translation template mRNA may be implemented as a part of a transcription/translation system as a cell-free protein synthesis system or may be implemented as a step prior to application to a translation system of the translation template mRNA. With respect to the translation template mRNA obtained in such a way, the reaction solution thereof can be applied to the translation system.

(Production Method of Protein)

The production method of a protein can have a step of synthesizing a protein by using translation template mRNA in the absence of a cell and in the presence of an element used for translating the translation template mRNA into a protein. The production method of a protein may further have a step of synthesizing translation template mRNA by using transcription template DNA in the absence of a cell and in the presence of an element used for transcribing the transcription template DNA onto mRNA. Furthermore, the production method of a protein may have a step of synthesizing the transcription template DNA by performing a nucleic acid amplification reaction on DNA including the code region of the target protein. The production method of a protein disclosed in the present application uses translation template mRNA and transcription template DNA including a translation enhancer and thus can efficiently perform protein synthesis.

Although the embodiments disclosed in the present application will be specifically described below with examples, these examples are provided only for the purpose of illustration of the embodiments. The examples are not intended to limit or restrict the scope of the invention disclosed in the present application.

EXAMPLES

[Procedure of Cell-free Protein Synthesis]

The cell-free protein synthesis procedure in Examples will be described.

(1) Structure of Transcribing Template DNA

Figure 2:
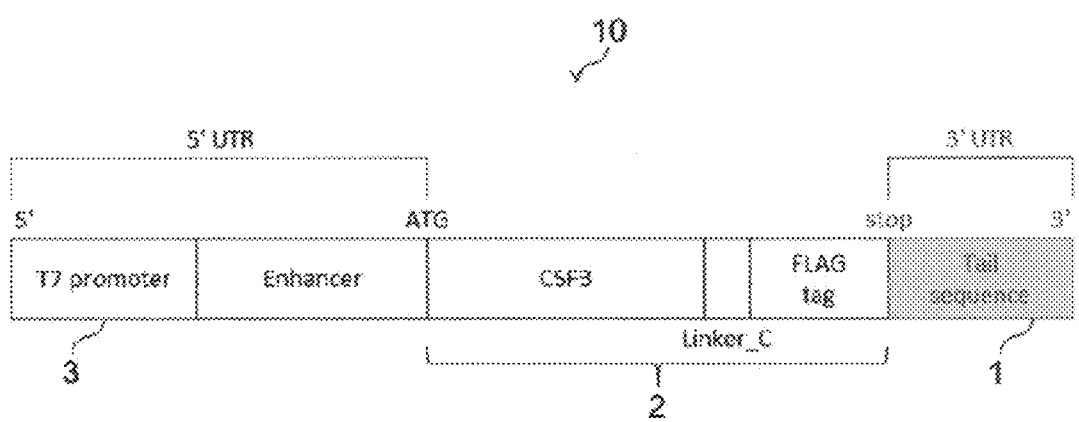
FIG. 2 is a schematic diagram illustrating an overview a transcribing template DNA used in Examples and Comparative examples.

The overview of the transcribing template DNA used in the Examples and Comparative examples will be described with reference to FIG. 2. As illustrated in FIG. 2, the transcription template DNA is formed of:

5' untranslated region (5'UTR): T7 promoter 3, enhancer;
Code region 2: Granulocyte colony-stimulating factor protein (CSF3), Linker C, FLAG tag; and
3' untranslated region (3'UTR).

In the Examples and the Comparative examples described later, experiments were made by replacing only the 3'UTR portion with various sequences. The sequences except the 3'UTR portion are as follows.

TABLE 1

| NAME | SEQUENCE | SEQ. ID. |
|---|---|---|
| T7 promoter | CCCGCGAAAT TAATACGACT CACTATA | 1 |
| Enhancer | GGG CTCACCTATC TCTCTACACA AAACATTTCC CTACATACAA CTTTCAACTT CCTATT | 2 |
| CSF3 | ATGGCTGGAC CTCCCACCCA GAGCCCCATG AAGCTGATGG CCCTGCACCT GCTGCTGTGG CACAGTGCAC TCTGGACAGT GCAGGAAGCC ACCCCCCTGG GCCCTGCCAG CTCCCTGCCC CAGAGCTTCC TGCTCAAGTG CTTAGAGCAA GTGAGGAAGA TCCAGGGCGA TGGCGCAGCG CTCCAGGAGA AGCTGGTGAG TGAGTGTGCC ACCTACAAGC TGTGCCACCC CGAGGAGCTG GTGCTGCTCG GACACTCTCT GGGCATCCCC TGGGCTCCCC TGAGCAGCTG CCCCAGCCAG GCCCTGCAGC TGGCAGGCTG CTTGAGCCAA CTCCATAGCG CCCTTTTCCT CTACCAGGGG CTCCTGCAGG CCCTGGAAGG GATCTCCCCC GAGTTGGGTC CCACCTTGGA CACACTGCAG CTGGACGTCG CCGACTTTGC CACCACCATC TGGCAGCAGA TGGAAGAACT GGGAATGGCC CCTGCCCTGC AGCCCACCCA GGGTGCCATG CCGGCCTTCG CCTCTGCTTT CCAGCGCCGG GCAGGAGGGG TCCTGGTTGC CTCCCATCTG CAGAGCTTCC TGGAGGTGTC GTACCGCGTT CTACGCCACC TTGCCCAGCC C | 3 |
| Linker_C | GGA CTC CAG CAG GGA GGT ACT | 4 |
| FLAG tag | GAC TAC AAG GAT GAC GAT GAC AAG | 5 |

(2) Creation of Transcription Template DNA with PCR

Figure 3:
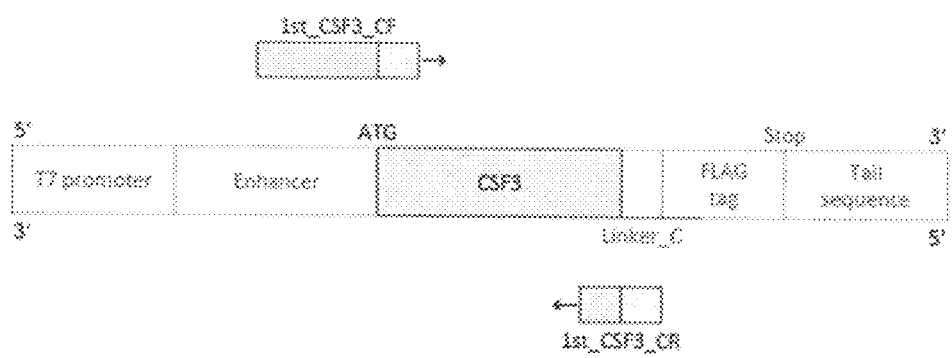
FIG. 3 is a schematic diagram illustrating a protocol of transcription template DNA using a PCR.
Figure 3:
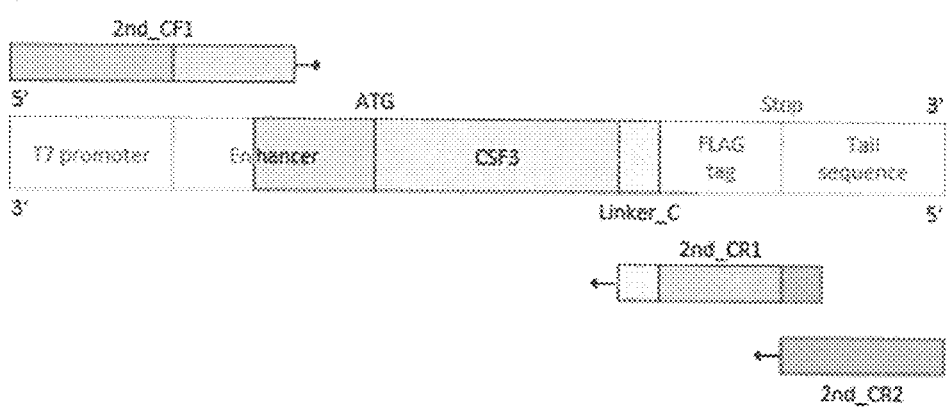

The protocol of transcription template DNA with a PCR will be described with reference to FIG. 3. The transcription template DNA was created by designing Primer as illustrated in FIG. 3 and creating the transcription template DNA by a two-step PCR. The reaction solution compositions and programs of the PCR are illustrated below. Note that the program illustrated in Table 5 is a dedicated program when primers indicated in SEQ. IDs. 30 and 31 were used.

TABLE 2

| 1st PCR reaction liquid | |
|---|---|
| Reagents | Volume |
| 10x PCR buffer | 5 μL |
| 2 mM dNTPs | 5 μL |
| 25 mM MgSO$_4$ | 3 μL |
| 10 μM 1st_CSF3_F | 1 μL |
| 10 μM 1st_CSF3_R | 1 μL |
| Plasmid DNA | 1 μL |
| PCR DNA Polymerase | 1 μL |
| Ultra pure water | 33 μL |
| Total | 50 μL |

TABLE 3

| 2nd PCR reaction liquid | |
|---|---|
| Reagents | Volume |
| 10x PCR buffer | 5 μL |
| 2 mM dNTPs | 5 μL |
| 25 mM MgSO$_4$ | 3 μL |
| 10 μM 2nd_CF1 | 1 μL |
| 100 nM 2nd_CR1 | 1 μL |
| 10 μM 2nd_CR2 | 1 μL |
| 1st PCR product | 1 μL |

TABLE 3-continued

2nd PCR reaction liquid

| Reagents | Volume |
|---|---|
| PCR DNA Polymerase | 1 μL |
| Ultra pure water | 32 μL |
| Total | 50 μL |

TABLE 4

1st/2nd PCR Program

| Seg. | Temp. | Time | Cycle |
|---|---|---|---|
| 1 | 94° C. | 2 min | 1 |
| 2-1 | 98° C. | 10 sec | 30 |
| 2-2 | 68° C. | 1 min | |
| 3 | 20° C. | — | — |

TABLE 5 dedicated program of 2nd PCR 2-1, 2-2

| Seg. | Temp. | Time | Cycle |
|---|---|---|---|
| 1 | 94° C. | 2 min | 1 |
| 2-1 | 98° C. | 10 sec | |
| 2-2 | 60° C. | 1 min | 5 |
| 2-3 | 68° C. | 1 min | |
| 3-1 | 98° C. | 10 sec | 30 |
| 3-2 | 68° C. | 1 min | |
| 4 | 72° C. | 2 min | 1 |
| 5 | 20° C. | — | — |

Note that reagents and machines used are as follows.
PCR enzyme: KOD-Plus-Neo by TOYOBO CO., LTD.
Primer, artificial gene: Eurofins Genomics K. K., custom synthesis service
Thermal Cycler: Mastecycler X50s by eppendorf (3) Transcription Reaction Next, the created transcription template DNA was used to create translation template mRNA. The transcription reaction was performed at 37 degrees Celsius for 3 hours by using the following reaction solutions of PSS4050 by NUProtein and using 2.5 μl of the PCR reaction solution (containing the transcription template DNA) created in the above (2) in advance.

TABLE 6

| Reagents | Volume |
|---|---|
| 10x Transcription buffer | 2.5 μl |
| 25 mM NTP Mix | 2.5 μl |
| T7 RNA Polymerase | 1 μl |
| 100 mM DTT | 1.25 μl |
| 2nd PCR Product | 2.5 μl |
| RNAase free water | 15.25 ul |
| Total | 25 μl |

To 25 μl of a transcription reaction solution, 10 μl of 4M ammonium acetate was added and well mixed, 100 μl of 100% ethanol was further added and flopped upside down and mixed, the mixture was centrifuged by a desktop centrifuge for several seconds, and then the mixture was left still at −20 degrees Celsius for 10 minutes. Then, the mixture was centrifuged (12,000 rpm, 15 minutes, 4 degrees Celsius). After the supernatant was removed, centrifugation was performed for several seconds by using the desktop centrifuge. The supernatant was again removed, and the precipitate was left still until it was dried. Then, 40 μl of RNasefree water (DEPC water) was added to 25 μl of the transcription reaction solution, and the precipitate was well suspended by a chip. In accordance with the PSS4050 protocol, nucleic acid concentration measurement was performed so that the mRNA amount in 110 μl of a translation solution was 35 μg, and this was filled up to 80 μl to prepare the translation template mRNA.

(4) Translation Reaction

Next, a translation reaction solution with the following compositions was used and put in an incubator at 16 degrees Celsius to react for 10 hours. Note that a composition solution containing compositions except the translation template mRNA out of the following compositions was prepared, the temperature of this composition solution was then back to room temperature, the translation template mRNA was then added, and pumping was made to react without bubbling. For Wheat germ extract and amino acid mix, PSS4050 by NUProtein was used.

TABLE 7

| Reagents | Volume |
|---|---|
| Wheat germ extract | 10 μl |
| Amino acid mix | 20 μl |
| mRNA liquid | 80 μl |
| Total | 110 μl |

After the reaction, the reaction solution was collected in an Eppendorf tube, centrifugation (15,000 rpm, 15 minutes, 4 degrees Celsius) was performed, and the supernatant was prepared as the protein solution resulted after the completion of translation. The procedure of analyzing the expression amount of the obtained protein is illustrated below.

<Reagents Used>
Gel: 4 to 15% Tris-Glycine gel (by Bio-Rad Laboratories)
Membrane: 0.2 μm PVDF membrane (by Bio-Rad Laboratories)
Primary antibody: FLAG antibody (mouse; by Wako Pure Chemical Industries, Ltd.)
Secondary antibody: goat anti mouse HRP antibody (by Southern Biotech)
Western blot luminescent reagent: SuperSignal West Pico (by Thermo)

<Analysis Procedure>

(1) 1 μL of the protein solution supernatant resulted after the completion of translation, 2.5 μL of 4x sample buffer, 1 μL of 2M DTT, and 5.5 μL of ultrapure water were mixed to prepare 10 μL of a sample.
(2) The sample was heated at 70 degrees Celsius for 10 minutes by a block heater.
(3) SDS-PAGE was performed on the heated sample.
(4) A gel and a membrane resulted after the completion of SDS-PAGE were equilibrated for 15 minutes by a Toubin buffer.
(5) The protein of the gel was electrically transcribed onto the membrane by a semi-dry transcription apparatus.
(6) The membrane was washed with ultrapure water for 2 minutes.
(7) Blocking of the membrane was performed with PBS+2% skim milk+0.05% Tween20 for 30 minutes.

(8) Antibodies were added to a moderate amount of the skim milk solution of (7) to have a primary antibody (1:2000) and a secondary antibody (1:1000).
(9) The antibody solution was packed with the membrane to react at room temperature for 1 hour.
(10) After completion of the reaction, the membrane was taken out from the pack and washed with the buffer of (7) for 5 minutes by 3 times.
(11) The membrane was washed with ultrapure water for 2 minutes.
(12) A luminescent reagent was evenly applied to the membrane and left for 3 minutes.
(13) A chemiluminescence imaging system Fusion Solo 7S. (by VILBER) was used to capture a luminescent amount of the membrane as a 3D image with the exposure time of 1 second.

Examples 1 to 2, Comparative Examples 1 to 3

(Evaluation of Hairpin Structure+Poly-A Sequence)
(1) Structure of Transcribing Template DNA
The transcribing template DNA having the following sequence was used as the 3'UTR of Examples 1 and 2 and Comparative Examples 1 to 3. The specific sequences are indicated in Table 8.
NAME 1-1 (Comparative example 1): poly-A sequence (length of 10)+nucleic acid sequence (length of 47, with hairpin structure)
NAME 1-2 (Comparative example 2): first region (length of 20, without hairpin structure)+poly-A sequence (length of 10)
NAME 1-3 (Comparative example 3): first region (length of 20, without hairpin structure)+poly-A sequence (length of 10)
NAME 1-4 (Example 1): first region (length of 20, with hairpin structure)+poly-A sequence (length of 10)
NAME 1-5 (Example 2): first region (length of 20, with hairpin structure)+poly-A sequence (length of 10)

TABLE 8

| NAME | SEQUENCE of 33'UTR (5' to 3' stop + 1st region 20_fold + poly A 10) | SEQ. ID. |
|---|---|---|
| 1-1 (Comparative example 1) | TAA AAAAAAAAAA GAGCTCTTGG ATCCGGCCAT AAGGGCCTGA TCCTTCGAGG GGGGGCC | 6 |
| 1-2 (Comparative example 2) | TAG AATAA GGCCATTTTTACCGG AAAAAAAAAA | 7 |
| 1-3 (Comparative example 3) | TAG AATAA GGCCCTTTTTCCCGG AAAAAAAAAA | 8 |
| 1-4 (Example 1) | TAG AATAA GTGCTCGGGCtGGCC AAAAAAAAAA | 9 |
| 1-5 (Example 2) | TAG AATAA GTGCTCGGGCtGGtC AAAAAAAAAA | 10 |

Figure 4:
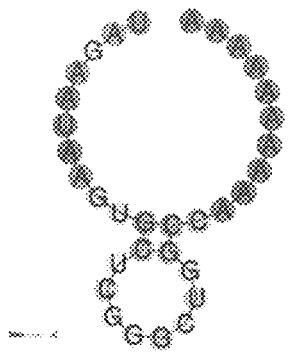
FIG. 4 is a diagram illustrating the structure when 3'UTR sequences of Examples 1 and 2 and Comparative examples 1 to 3 were analyzed by using mRNA secondary structure prediction software, CentroidFold.
Figure 4:
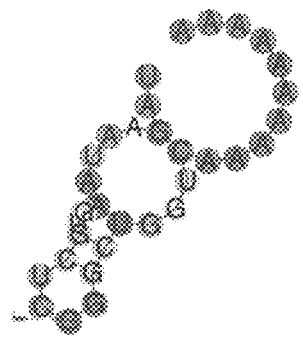
Figure 4:
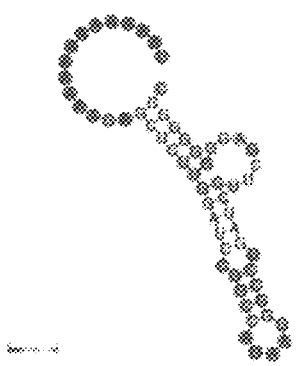
Figure 4:
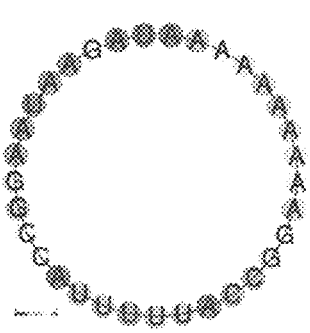
Figure 4:
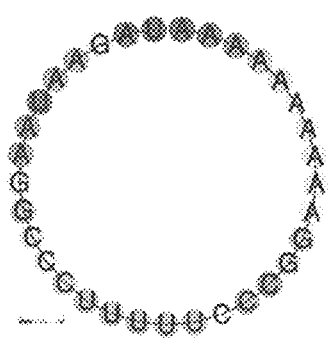

Further, FIG. 4 illustrates the structures found by analyzing the 3'UTR sequence of Examples 1 and 2 and Comparative examples 1 to 3 by using mRNA secondary structure prediction software, CentroidFold (http://rtools.cbrc.jp/centroidfoldn
(2) Comparison of Protein Synthesis Amount
A protein was synthesized by using the transcribing template DNA of Examples 1 and 2 and Comparative examples to 3 in accordance with "[Procedure of Cell-free Protein Synthesis]" as described above. The used primers are indicated below. Note that different primers were used for "2nd Reverse primer CR2" in accordance with Examples 1 and 2 and Comparative examples 1 to 3, and the same primer was used for the remaining primers.

TABLE 9

| NAME | SEQUENCE | SEQ. ID. |
|---|---|---|
| *1st gene specific PCR primer 10 µM* | | |
| CSF3_CF | CACAAAACAT TCCCTACAT ACAACTTTCA ACTTCCTATT ATGGCTGGAC CTGCCACC | 11 |
| CSF3_CR | AGTACCTCCC TGCTGGAGAC CGGGCTGGGC AAGGTGGCG | 12 |
| *2nd Reverse primer CR1 100 µM* | | |
| CR1_1-1 | CCCTCGAAGG ATCAGGCCCT TATGGCCGGA TCCAAGAGCT CTTTTTTTTT TTTACTTGTC ATCGTCATCC TTGTAGTCAG TACCTCCCTG CTGG | 13 |
| CR1_U20 | GGCCCTCCCG AGCACTTATT CTACTTGTCA TCGTCATCCT TGTAGTCAGT ACCTCCCTGC TGG | 14 |
| *2nd Reverse primer CR2 10 µM* | | |
| CR2 1-1 | GGCCCCCCCT CGAAGG | 15 |
| CR2 1-2 | TTTTTTTTTT CCGGTAAAAATGGCC TTATT CTACTTGTCA TCG | 16 |
| CR2 1-3 | TTTTTTTTTT CCGGGAAAAGGGCC TTATT CTACTTGTCA TCG | 17 |
| CR2 1-4 | TTTTTTTTTT GGCCAGCCCG AGCACTTATT CTACTTGTCA TCG | 18 |
| CR2 1-5 | TTTTTTTTTT GACCAGCCCG AGCACTTATT CTACTTGTCA TCG | 19 |
| *2nd Forward primer CF1 10 µM* | | |
| CF1 | CCCGCGAAATTAATACGACTCACTATAGGGCTCACCTATCTCTCTACACAAAACATTTCC | 20 |

Figure 5:
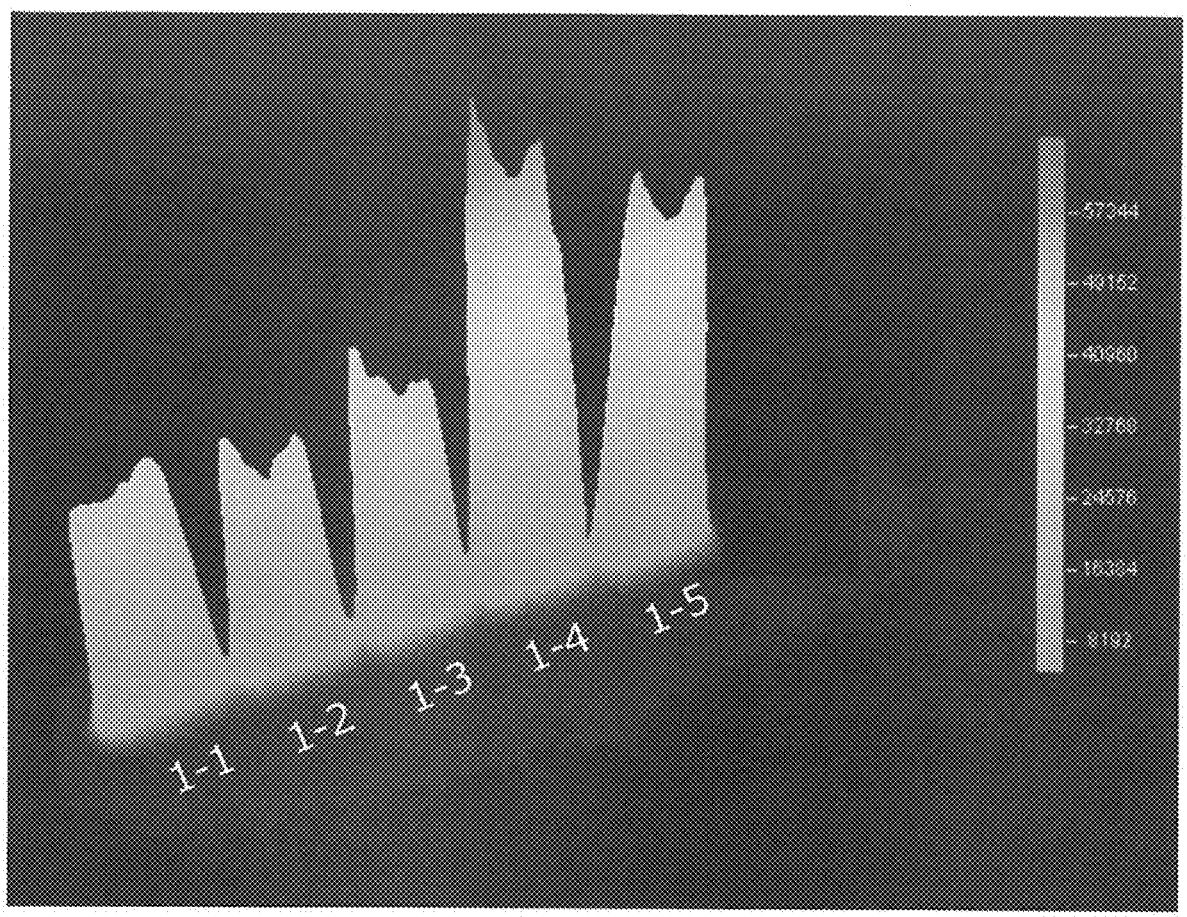
FIG. 5 is a 3D image illustrating protein expression amounts of Examples 1 and 2 and Comparative examples 1 to 3.

FIG. 5 is a 3D image illustrating the protein expression amounts in Examples 1 and 2 and Comparative examples 1 to 3. As is clear from FIG. 5, in the case of Comparative examples 2 and 3 in which the first region of the 3' UTR has no hairpin structure, the protein expression amount was substantially the same as that in Comparative example 1. On the other hand, in the case where the first region of the 3'UTR has the hairpin structure and the poly-A sequence was provided to the tail of the first region, significant improvement was found in the protein expression amount.

Further, Comparative example 1 corresponds to "A10+47 bp" having the most improved protein expression amount in Example 7 (FIG. 18) of Patent Literature 6 and has the hairpin structure as illustrated in FIG. 4. However, the order of the first region and the second region of the translation enhancer disclosed in the present application is opposite, and as a result, the protein expression amount is low. From the above results, it was confirmed that an advantageous effect of significant improvement in the protein synthesis amount is resulted from the features that the first region has the hairpin structure and that the second region consisting of a poly-A sequence is formed on the 3' terminal side of the first region having the hairpin structure.

Examples 3 to 5, Comparative Example 4

(Study of Length of First Region)
Next, the relationship between the length of the first region and the protein expression amount was examined.
(1) Structure of Transcribing Template DNA
The transcribing template DNA having the following sequences was used as the 3'UTR of Examples 3 to 5 and Comparative Example 4. The specific sequences are indicated in Table 10.

TABLE 10

| NAME | SEQUENCE of 3'UTR (5 ' to 3' stop + 1st region 0~ 40 + poly A 10) | SEQ. ID. |
|---|---|---|
| 2-1 (Comparative example 4) | TAG AAAAAAAAAA | 21 |
| 2-2 (Example 3) | TAG AATAA GTGCT AAAAAAAAAA | 22 |
| 2-3 (Example 4) | TAG AATAA AGTAA ATATA GTGCTCGGGCGGGCC AAAAAAAAAA | 22 |
| 2-4 (Example 5) | TAG AATAA AGTAA ATATA CACGAGCCCG GTGCTCGGGCGGGCC AAAAAAAAAA | 24 |

Figure 6:
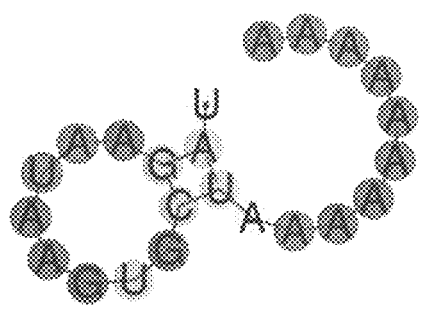
FIG. 6 is a diagram illustrating the structure when 3'UTR sequences of Examples 3 to 5 were analyzed by using mRNA secondary structure prediction software, CentroidFold.
Figure 6:
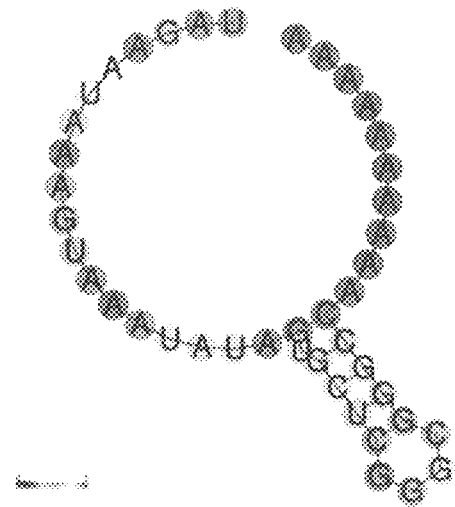
Figure 6:
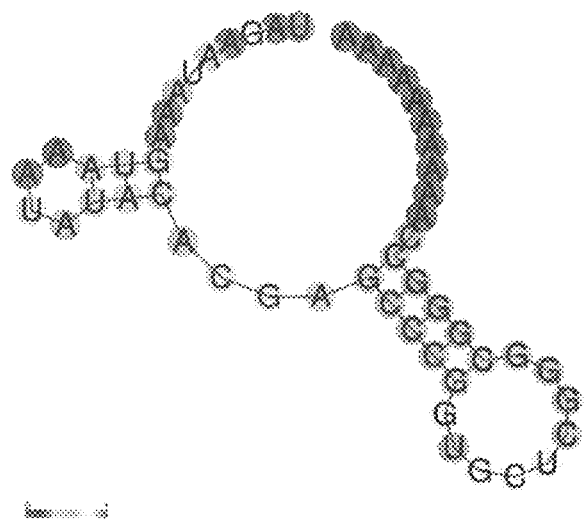

Further, FIG. 6 illustrates the structures found by analyzing the 3'UTR sequence of Examples 3 to 5 by using mRNA secondary structure prediction software, CentroidFold (http://rtools.cbrc.jp/centroidfold/). As illustrated in FIG. 6, Examples 3 to 5 all have the hairpin structure even with different lengths of the first region.

(2) Comparison of Protein Synthesis Amount
A protein was synthesized by using the transcribing template DNA of Examples 3 to 5 and Comparative example 4 in accordance with "[Procedure of Cell-free Protein Synthesis]" as described above. The used primers are indicated below. Note that those having the same number of SEQ. ID. mean the same sequence.

TABLE 11

| NAME | SEQUENCE | SEQ. ID. |
|---|---|---|
| 1st gene specific PCR primer 10 μM | | |
| CSP3_CF | CACAAAACAT TTCCCTACAT ACAACTTTCA ACTTCCTATT ATGGCTGGAC CTGCCACC | 11 |
| CSF3_CR | AGTACCTCCC TGCTGGAGAC CGGGCTGGGC AAGGTGGCG | 12 |
| CSF3_CR_U30/40 | TCATCCTTGT AGTCAGTACC TCCCTGCTGG AGACCGGGCT GGGCAAGGTG GCG | 25 |
| 2nd Reverse primer CR1 100 μM | | |
| CR1_U0(2-1) | CTACTTGTCA TCGTCATCCT TGTAGTCAGT ACCTCCCTGC TGG | 26 |
| CR1_U10(2-2) | AGCACTTATT CTACTTGTCA TCGTCATCCT TGTAGTCAGT ACCTCCCTGC TGG | 27 |
| CR1_U80(2-3) | GGCCCTCCCG AGCACTATAT TTACTTTATT CTACTTGTCA TCGTCATCCT TGTAGTC | 28 |
| CR1_U40(2-4) | GGCCCTCCCG AGCACCGGGC TCGTGTATAT TTACTTTATT CTACTTGTCA TCGTCATCCT TGTAGTC | 29 |
| 2nd Reverse primer CR2 10 μM | | |
| CR2_U0(2-1) | TTTTTTTTTT CTACTTGTCA TCGTC 30 | |
| CR2_U10(2-2) | TTTTTTTTTT AGCACTTATT CTA | 31 |
| CR2_U30(2-3) | TTTTTTTTTT GGCCCGCCCG AGCAC | 32 |
| CR2_U30(2-4) | TTTTTTTTTT GGCCCGCCCG AGCAC | 32 |
| 2nd Forward primer CF1 10 μM | | |
| CP1 | CCCGCGAAATTAATACGACTCACTATAGGGCTCACCTATCTCTCTACACAAAACATTTCC | 20 |

NAME 2-1 (Comparative example 4): first region (length of 0)+poly-A sequence (length of 10)
NAME 2-2 (Example 3): first region (length of 10)+poly-A sequence (length of 10)
NAME 2-3 (Example 4): first region (length of 30)+poly-A sequence (length of 10)
NAME 2-4 (Example 5): first region (length of 40)+poly-A sequence (length of 10)

Figure 7:
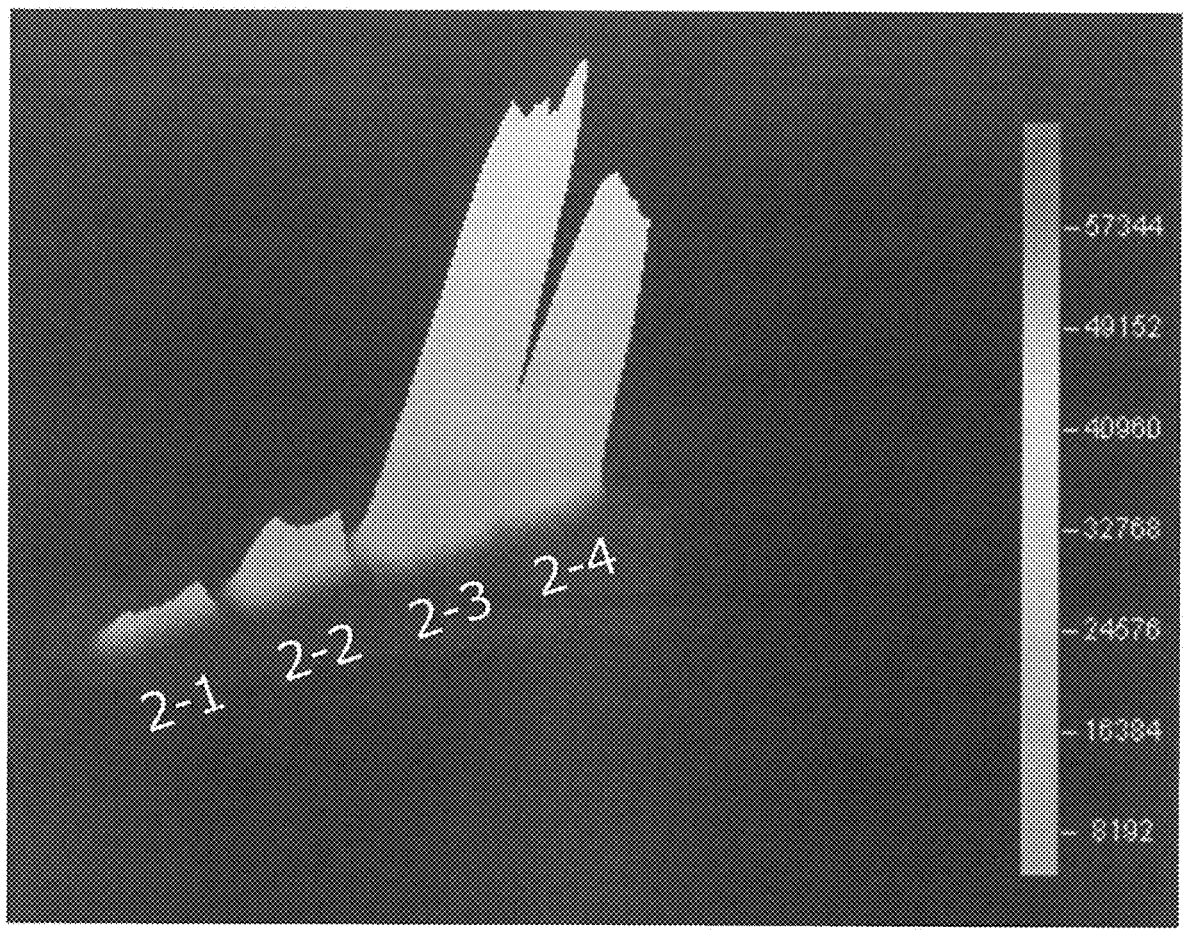
FIG. 7 is a 3D image illustrating protein expression amounts of Examples 3 to 5 and Comparative example 4.

FIG. 7 is a 3D image illustrating the protein expression amounts of Examples 3 to 5 and Comparative example 4. As is clear from FIG. 7, compared to Comparative example 4 (2-1) whose length of the first region of the 3'UTR is 0 (having no hairpin structure), the protein expression amount was improved in all the cases where the length of nucleic acids of the first region was 10 (2-2, Example 3), 30 (2-3, Example 4), and 40 (2-5, Example 5). From the above results, it was revealed that it is preferable to adjust the length of the first region as appropriate within a range that enables formation of the hairpin structure.

Examples 6 to 9, Comparative Example 5

(Study of Length of Poly-A Sequence)
Next, the relationship between the length of the poly-A sequence and the protein expression amount was examined.
(1) Structure of Transcribing Template DNA
The transcribing template DNA having the following sequences was used as the 3'UTR of Examples 6 to 9 and Comparative Example 5. The specific sequences are indicated in Table 12.

NAME 3-1 (Comparative example 5): first region (length of 20)+poly-A sequence (length of 0)
NAME 3-2 (Example 6): first region (length of 20)+poly-A sequence (length of 10)
NAME 3-3 (Example 7): first region (length of 20)+poly-A sequence (length of 20)
NAME 3-4 (Example 8): first region (length of 20)+poly-A sequence (length of 40)
NAME 3-5 (Example 9): first region (length of 20)+poly-A sequence (length of 2)

TABLE 12

| NAME | SEQUENCE of 3'UTR (5' to 3' stop + 1st region 20_fold + poly A 0~40) | SEQ. ID. |
|---|---|---|
| 3-1 (Comparative example 5) | TAG AATAA GTGCTCGGGCGGGCC | 22 |
| 3-2 (Example 6) | TAG AATAA GTGCTCGGGCGGGCC AAAAAAAAAA | 34 |
| 3-3 (Example 7) | TAG AATAA GTGCTCGGGCGGGCC AAAAAAAAAA AAAAAAAAAA | 35 |
| 3-4 (Example 2) | TAG AATAA GTGCTCGGGCGGGCC AAAAAAAAAA AAAAAAAAAA AAAAAAAAAA AAAAAAAAAA | 36 |
| 3-5 (Example 9) | TAG AATAA GTGCTCGGGCGGGCC AA | 37 |

Figure 8:
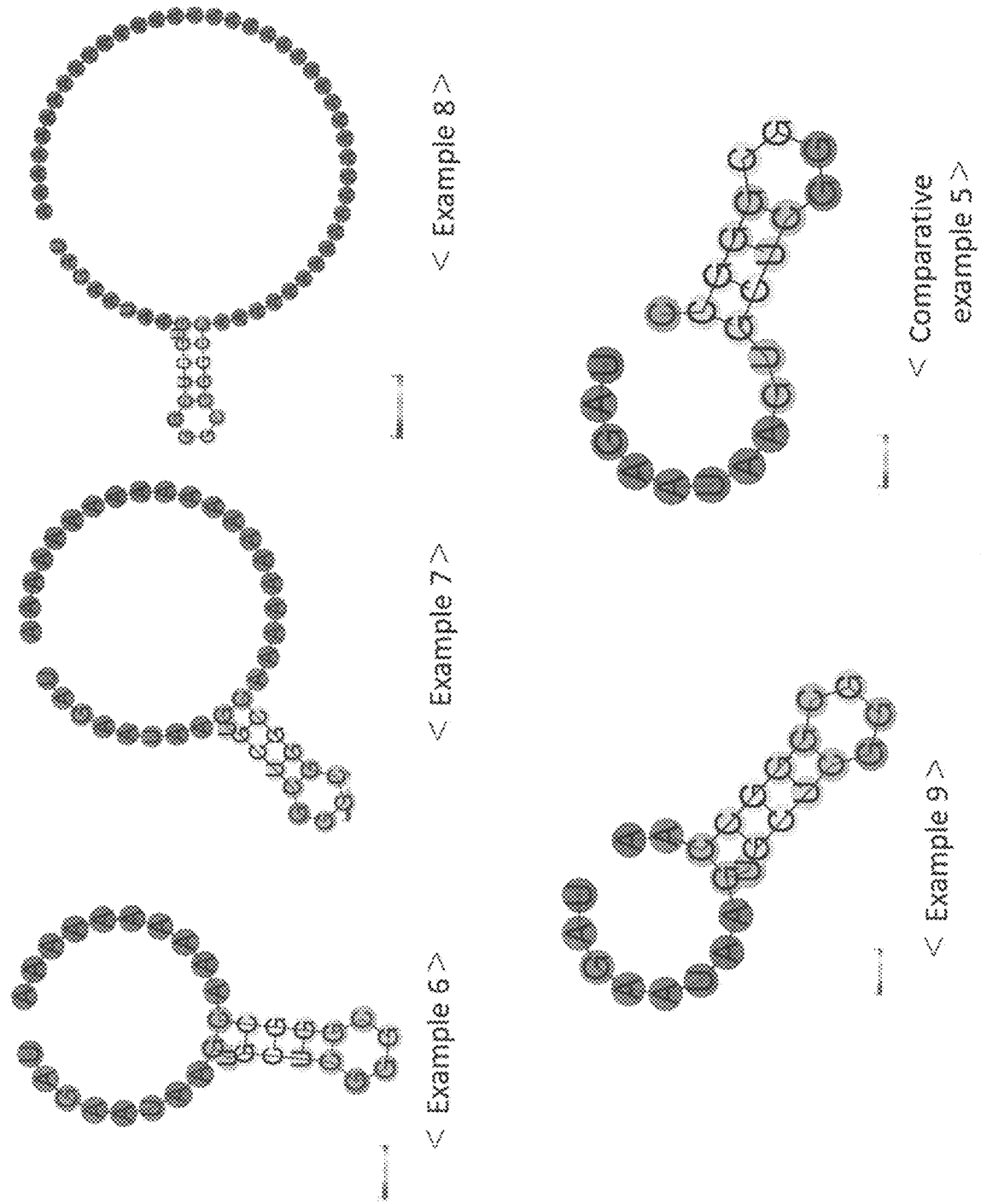
FIG. 8 is a diagram illustrating the structure when 3'UTR sequences of Examples 6 to 9 and Comparative example 5 were analyzed by using mRNA secondary structure prediction software, CentroidFold.

Further, FIG. 8 illustrates the structures found by analyzing the 3'UTR sequence of Examples 6 to 9 and Comparative example 5 by using mRNA secondary structure prediction software, CentroidFold (http://rtools.cbrc.jp/centroidfoldn As illustrated in FIG. 8, the first regions used in Examples 6 to 9 and Comparative example 5 have the hairpin structure.

(2) Comparison of Protein Synthesis Amount
A protein was synthesized by using the transcribing template DNA of Examples 6 to 9 and Comparative example 5 in accordance with "[Procedure of Cell-free Protein Synthesis]" as described above. The used primers are indicated below. Note that those having the same number of SEQ. ID. mean the same sequence.

TABLE 13

| NAME | SEQUENCE | SEQ. ID |
|---|---|---|
| 1st gene specific PCR primer 10 µM | | |
| CSF3_CF | CACAAAACAT TCCCTACAT ACAACTTTCA ACTTCCTATT ATGGCTGGAC CTGCCACC | 11 |
| CSF3_CR | AGTACCTCCC TGCTGGAGAC CGGGCTGGGC AAGGTGGCG | 12 |
| 2nd Reverse primer CR1 100 µM | | |
| CR1_U20 | GGCCCTCCCG AGCACTTATT CTACTTGTCA TCGTCATCCT TGTAGTCAGT ACCTCCCCTGC TGG | 14 |
| 2nd Reverse primer CR2 10 µM | | |
| CR2_A0(3-1) | GGCCCGCCCG AGCAC | 38 |
| CR2_A10(3-2) | TTTTTTTTTT GGCCCGCCCG AGCAC | 39 |
| CR2_A20(3-3) | TTTTTTTTTT TTTTTTTTTT GGCCCGCCCG AGCAC | 40 |
| CR2_A40(3-4) | TTTTTTTTTT TTTTTTTTTT TTTTTTTTTT TTTTTTTTTT GGCCCGCCCG AGCAC | 41 |
| CR2_A2(3-5) | TT GGCCCCCCCG AGCAC | 42 |
| 2nd Forward primer CF1 10 µM | | |
| CF1 | CCCGCGAAATTAATACGACTCACTATAGGGCTCACCTATCTCTCTACACAAAACATTTCC | 20 |

Figure 9:
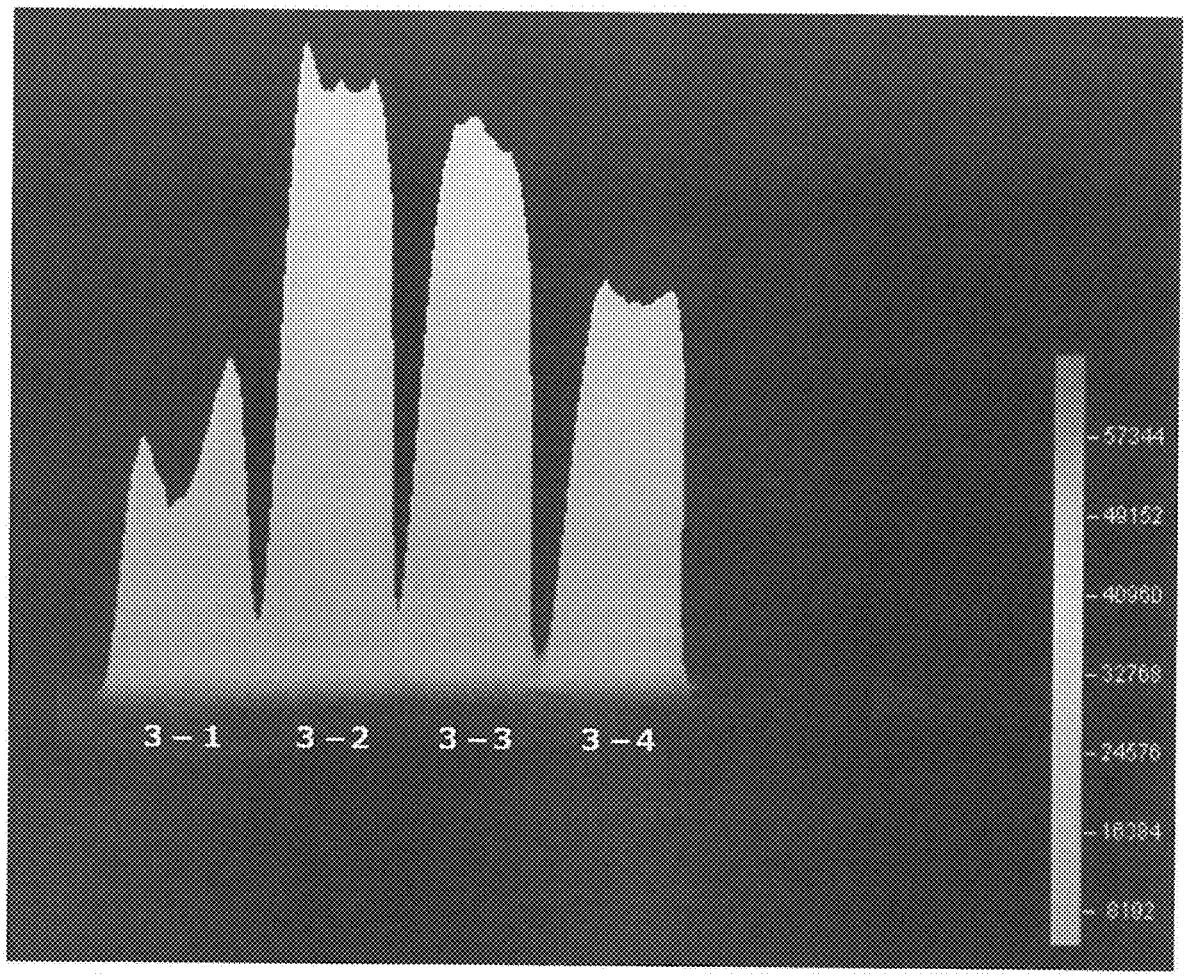
FIG. 9 is a 3D image illustrating protein expression amounts of Examples 6 to 8 and Comparative example 5.

FIG. 9 is a 3D image illustrating the protein expression amounts of Examples 6 to 8 and Comparative example 5. As is clear from FIG. 9, with respect to the poly-A sequence linked to the first region, the protein expression amount is larger when the poly-A length is 10 (3-2, Example 6), and while the protein expression amount gradually decreased as the poly-A length increases, the protein expression amount in the case where the poly-A length is 10 to 40 is larger than that in the case of Comparative example 5 (3-1, poly-A length of 0).

Figure 10:
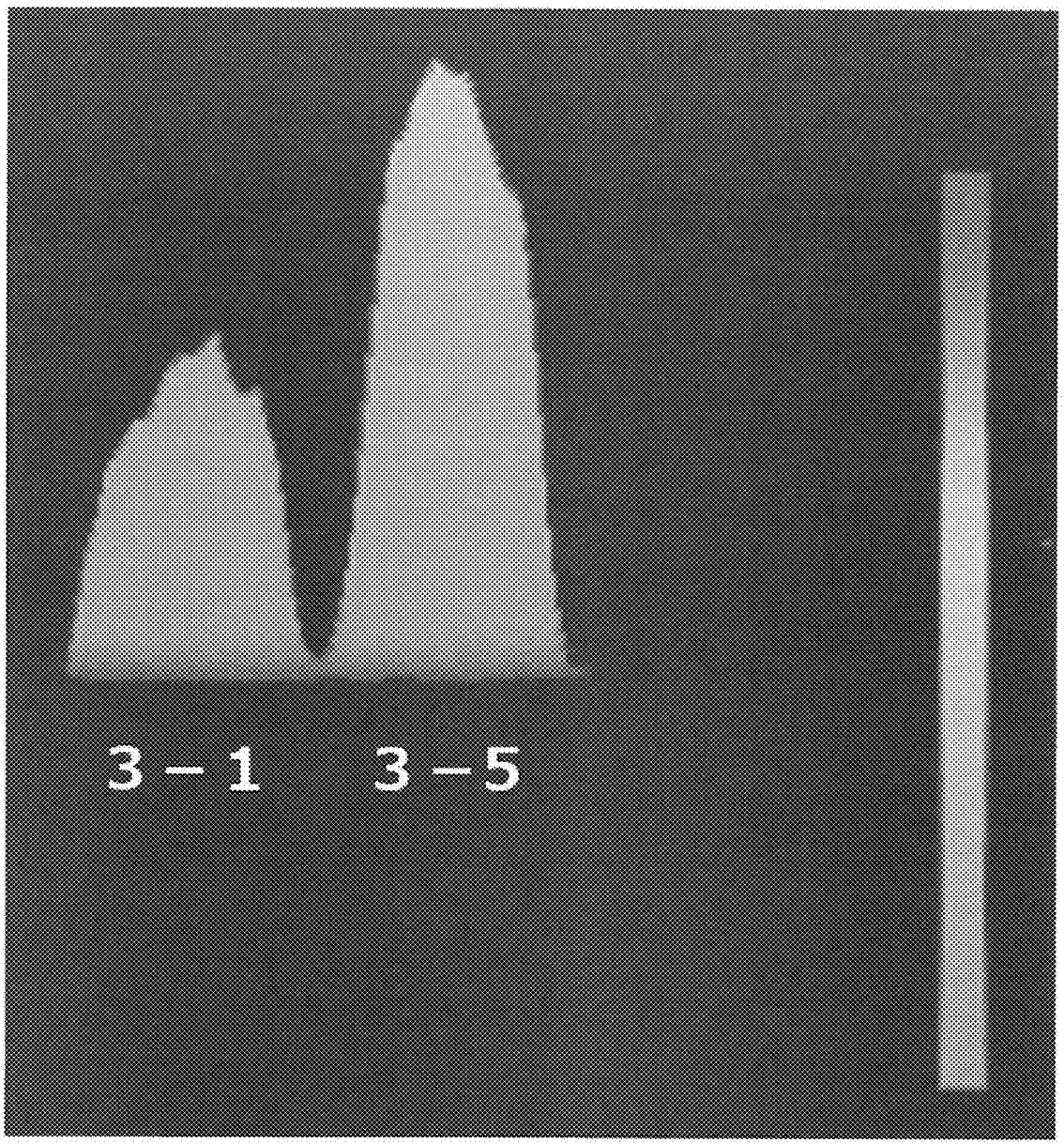
FIG. 10 is a 3D image illustrating protein expression amounts of Example 9 and Comparative example 5.

Next, FIG. 10 is a 3D image illustrating the protein expression amounts of Example 9 (3-5, two "poly-A" s) and Comparative example 5. As is clear from FIG. 10, it was confirmed that the protein expression amount increased compared to Comparative example 5 having 0 poly-A even with two "A"s linked to the tail of the first region. Therefore, it is preferable to adjust the poly-A length to be two or longer as appropriate.

According to the above results, it was revealed that, when a translation enhancer is created in combination of the first region having the hairpin structure and the poly-A sequence, at least two "poly-A"s are necessary, and the upper limit of the poly-A sequence can be selected as appropriate taking design efficiency of template nucleic acids or the like into consideration.

INDUSTRIAL APPLICABILITY

According to the translation enhancer disclosed in the present application, it is possible to increase the protein synthesis amount synthesized by using a cell-free protein synthesis system. Therefore, the translation enhancer disclosed in the present application is useful in industries such as the pharmaceutical industry, research institutes, or the like that require cell-free protein synthesis.

[Sequence Listing]

The invention claimed is:

1. A translation enhancer used in a cell-free protein synthesis system, the translation enhancer consisting of a nucleic acid as a 3' untranslated region linked adjacent to a 3' terminus of a code region that encodes an amino acid sequence of a target protein,
wherein the 3' untranslated region consists of:
a first region consisting of a sequence of 10 to 40 nucleic acids adjacent to the 3' terminus of the code region, and
a second region consisting of a poly-A sequence having continuous 2 to 20 "A"s directly linked to the first region, and
wherein the first region has a hairpin structure,
the 3' terminus of the first region is not "A", and
no additional nucleic acid is linked to the 3' terminus of the second region.

2. A template nucleic acid used in a cell-free protein synthesis system, the template nucleic acid comprising:
a promoter region;
the code region that encodes the amino acid sequence of the target protein linked so as to be operable by the promoter region, and
the 3' untranslated region of the code region,
wherein the 3' untranslated region consists of the translation enhancer according to claim 1.

3. The template nucleic acid according to claim 2, wherein the code region is a region that encodes a fusion protein containing a protein tag at a C-terminus of the target protein.

4. The template nucleic acid according to claim 2, wherein the code region is a region that encodes a fusion protein containing a protein tag at an N-terminus of the target protein.

5. The template nucleic acid according to claim 3, wherein the code region is a region that encodes a fusion protein containing a protein tag at an N-terminus of the target protein.

6. The template nucleic acid according to claim 2, wherein the template nucleic acid is a transcription template DNA.

7. A production method of a translation template for a cell-free protein synthesis system, the production method comprising a step of synthesizing a translation template mRNA by using the template nucleic acid according to claim 2 in absence of a cell and in presence of an element used for transcribing a transcription template DNA onto an mRNA.

8. The template nucleic acid according to claim 3, wherein the template nucleic acid is a transcription template DNA.

9. The template nucleic acid according to claim 4, wherein the template nucleic acid is a transcription template DNA.

10. The template nucleic acid according to claim 5, wherein the template nucleic acid is a transcription template DNA.

11. A production method of a translation template for a cell-free protein synthesis system, the production method comprising a step of synthesizing translation template mRNA by using the template nucleic acid according to claim 3 in absence of a cell and in presence of an element used for transcribing a transcription template DNA onto mRNA.

12. A production method of a translation template for a cell-free protein synthesis system, the production method comprising a step of synthesizing a translation template mRNA by using the template nucleic acid according to claim 6 in absence of a cell and in presence of an element used for transcribing a transcription template DNA onto an mRNA.

13. A translation template mRNA used in a cell-free protein synthesis system, the translation template mRNA comprising:
a code region that encodes an amino acid sequence of a target protein; and
a 3' untranslated region of the code region,
wherein the 3' untranslated region consists of the translation enhancer according to claim 1.

14. A translation template mRNA used in a cell-free protein synthesis system, the translation template mRNA comprising:
a code region that encodes an amino acid sequence of a target protein; and
a 3' untranslated region of the code region, wherein the 3' untranslated region consists of the translation enhancer according to claim 1,
wherein the code region is a region that encodes a fusion protein containing a protein tag at a C-terminus of the target protein.

15. The translation template mRNA according to claim 14, wherein the code region is a region that encodes a fusion protein containing a protein tag at an N-terminus of the target protein.

16. A translation template mRNA used in a cell-free protein synthesis system, the translation template mRNA comprising:
a code region that encodes an amino acid sequence of a target protein; and
a 3' untranslated region of the code region, wherein the 3' untranslated region consists of the translation enhancer according to claim 1,
wherein the code region is a region that encodes a fusion protein containing a protein tag at an N-terminus of the target protein.

17. A production method of a protein, the production method comprising a step of synthesizing a protein by using the translation template mRNA according to claim 13 in absence of a cell and in presence of an element used for translating the translation template mRNA into the protein.

18. The translation enhancer according to claim 1, wherein a number of loop structures in the hairpin structure is two or more.

* * * * *